(12) United States Patent
Guilloux

(10) Patent No.: US 10,459,251 B2
(45) Date of Patent: Oct. 29, 2019

(54) PROGRESSIVE MULTIFOCAL LENS HAVING AN ENLARGED INTERMEDIATE DISTANCE VISION REGION

(71) Applicant: Essilor International, Charenton-le-Pont (FR)

(72) Inventor: Cyril Guilloux, Charenton-le-Pont (FR)

(73) Assignee: Essilor International, Charenton-le-Pont (FR)

( * ) Notice: Subject to any disclaimer, the term of this patent is extended or adjusted under 35 U.S.C. 154(b) by 273 days.

(21) Appl. No.: 15/311,075

(22) PCT Filed: May 15, 2015

(86) PCT No.: PCT/EP2015/060737
§ 371 (c)(1),
(2) Date: Nov. 14, 2016

(87) PCT Pub. No.: WO2015/173381
PCT Pub. Date: Nov. 19, 2015

(65) Prior Publication Data
US 2017/0108712 A1    Apr. 20, 2017

(30) Foreign Application Priority Data

May 15, 2014    (EP) .................................... 14305716

(51) Int. Cl.
*G02C 7/06* (2006.01)
*G02C 7/02* (2006.01)
*G02C 13/00* (2006.01)

(52) U.S. Cl.
CPC ............. *G02C 7/061* (2013.01); *G02C 7/027* (2013.01); *G02C 7/028* (2013.01); *G02C 7/065* (2013.01); *G02C 13/005* (2013.01)

(58) Field of Classification Search
CPC ........ G02C 7/061; G02C 7/027; G02C 7/028; G02C 7/065; G02C 13/005
(Continued)

(56) References Cited

U.S. PATENT DOCUMENTS 4,786,160 A    11/1988  Fuerter
4,796,988 A    1/1989   Dufour et al.
(Continued)

FOREIGN PATENT DOCUMENTS

EP    2 369 403 A1    9/2011
FR    2 587 505 A1    3/1987

OTHER PUBLICATIONS

International Search Report and Written Opinion dated Aug. 4, 2015 in PCT/EP2015/060737 filed May 15, 2015.

*Primary Examiner* — Evan P Dzierzynski
*Assistant Examiner* — Mitchell T Oestreich
(74) *Attorney, Agent, or Firm* — Oblon, McClelland, Maier & Neustadt, L.L.P.

(57) ABSTRACT

A progressive multifocal lens adapted to correct a user's vision and including a first major surface and a second major surface, wherein the first major surface is positioned closest to the user's eye when the progressive multifocal lens is worn by the user, the progressive multifocal lens including: a far-distance vision region having a first refractive power, a near-distance vision region having a second refractive power, an intermediate-distance vision region having a third refractive power, and a first and a second progressive region, a main line of sight extending from the far-distance vision region to the near-distance vision and passing through the intermediate-distance vision region. The first progressive region joins the far-distance vision region and the interme- (Continued)

diate-distance vision region and the second progressive region joins the intermediate-distance vision region and the near-distance vision region.

15 Claims, 10 Drawing Sheets

(58) Field of Classification Search
USPC .................................................. 351/159.42
See application file for complete search history.

(56) References Cited

U.S. PATENT DOCUMENTS

| | | | |
|---|---|---|---|
| 2009/0213325 A1* | 8/2009 | Katzman | G02C 7/027 351/159.42 |
| 2011/0222019 A1 | 9/2011 | Suzuki et al. | |

* cited by examiner

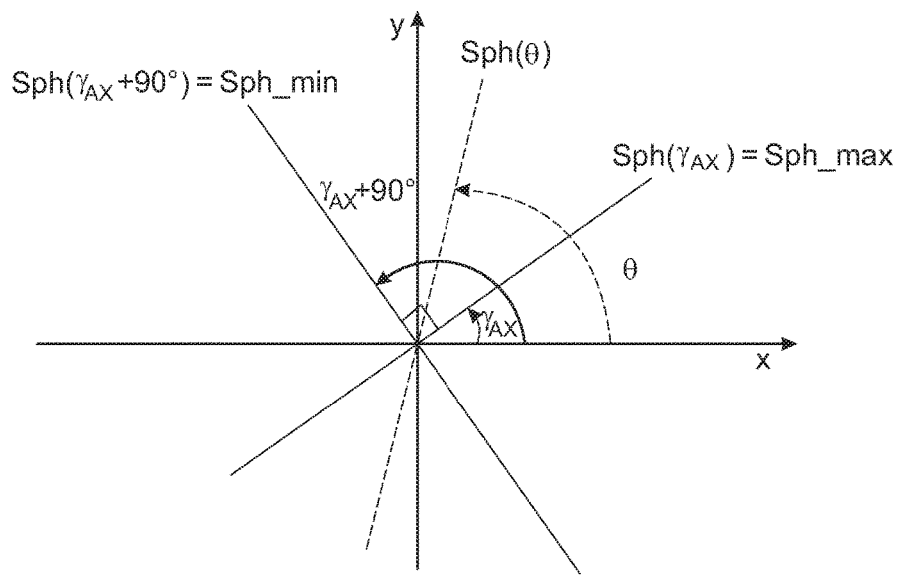
Fig. 4
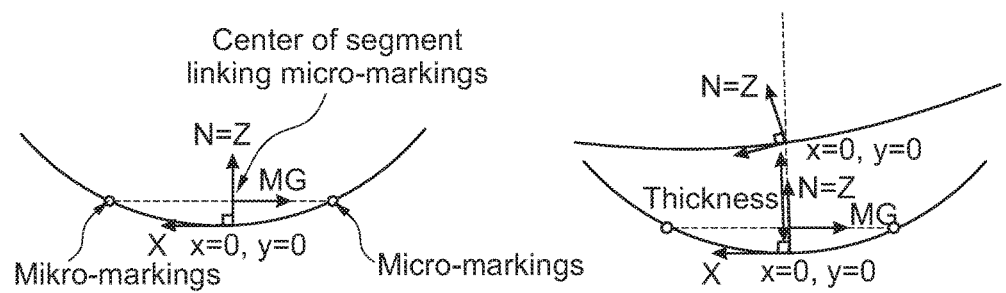
Fig. 5
Fig. 6

PROGRESSIVE MULTIFOCAL LENS HAVING AN ENLARGED INTERMEDIATE DISTANCE VISION REGION

TECHNICAL FIELD

The invention relates to a progressive multifocal lens adapted of correcting a user's vision and having a first major surface and a second major surface, where the first major surface is positioned closest to the user's eye when the progressive multifocal lens is worn by the user. The invention further relates to a method for determining and manufacturing an progressive multifocal lens according to the invention.

BACKGROUND OF THE INVENTION

The discussion of the background of the invention herein is included to explain the context of the invention. This is not to be taken as an admission that any of the material referred to was published, known or part of the common general knowledge at the priority date of any of the claims.

Usually, progressive multifocal lenses have a far distance vision region particularly adapted for far distance vision and a near distance vision region particularly adapted for near distance vision. The far distance vision region provides to the wearer a first refractive power and the near distance vision region provides to the wearer a second refractive power. The far and near distance vision regions are usually linked by a progressive region along which the refractive power progresses continuously.

Such progressive multifocal lenses are well adapted to provide a wearer a clear vision at near distance and far distance and the progressive region provides the wearer with a progressive refractive power so as to see at intermediate distances.

Although the progressive region may be used by the wearer to seek an intermediate distances, the visual comfort of the wearer may be reduced when using the progressive region of the progressive multifocal lens. In particular, the progressive region is usually narrow.

The use of intermediate distance vision increases, in particular since wearers spend more and more time reading on screens such as computer screens.

Existing ophthalmic lenses provide extended intermediate distance vision region. Usually such extension is done at the expense of the comfort of the wearer in other situations of vision.

For example, the extension of the intermediate distance vision region may be obtain by spreading significantly the peripheral aberrations related to the progression, thus directing the distribution of defects to ultra-soft design, resulting in reduced widths of the far and near distance vision regions.

The extension of the intermediate distance vision region may also be obtain by extending the length of progression, which has the effect of reducing the power gradients and thus reducing aberrations, but makes the transition between the different distance vision region uncomfortable.

Therefore, there is a need for a progressive multifocal lens that would provide high degree of visual comfort to the wearer when seeking at far, near and intermediate distances.

An aim of the present invention is to propose such a progressive multifocal ophthalmic lens.

SUMMARY OF THE INVENTION

To this end, the present invention relates to a progressive multifocal lens adapted of correcting a user's vision and having a first major surface and a second major surface, where the first major surface is positioned closest to the wearer's eye when the progressive multifocal lens is worn by the wearer. The progressive multifocal lens comprises at least:
- a far-distance vision region having a first refractive power,
- a near-distance vision region having a second refractive power,
- an intermediate-distance vision region having a third refractive power, and
- a first and a second progressive region,
- a main line of sight extending from the far-distance vision region to the near-distance vision and passing through the intermediate-distance vision region.

The first progressive region joins the far-distance vision region and the intermediate-distance vision region and the second progressive region joins the intermediate-distance vision region and the near-distance vision region.

Advantageously, the progressive multifocal ophthalmic lens of the invention has a first refractive power over the far-distance vision region, a second refractive power over the near distance vision region and a third refractive power over the intermediate distance vision region, thus well adapted for all distance vision, in particular far, near and intermediate.

The first and second progressive regions provide the wearer with refractive power for all distances between the far and near distances.

According to further embodiments which can be considered alone or in combination:
- main line of sight corresponds to the meridian line of the multifocal lens; and/or
- the intermediate-distance vision region comprises an area of stabilized optical power; and/or
- the progressive multifocal lens comprises at least an intermediate section of the main line of sight along which the power gradient has at least two maximum and one minimum, the two maximum being smaller or equal to 1.75 time the mean value of power gradient over the section of the main line of sight comprised between the point of the main line of sight for which the optical power of the lens reaches 10% of the addition of the lens to the point of the main line of sight for which the optical power of the lens reaches 85% of the addition; and/or
- each point of the main line of sight comprised between the point of the main line of sight for which the optical power of the lens reaches 10% of the addition of the lens to the point of the main line of sight for which the optical power of the lens reaches 85% of the addition, the difference between the optical power of the lens and the linear optical power progression function is smaller than or equal to Add/4, with Add the addition of the optical lens and the linear optical power progression function being defined between the point of the main line of sight for which the optical power of the lens reaches 10% of the addition of the lens and the point of the main line of sight for which the optical power of the lens reaches 85% of the addition; and/or
- under usual wearing conditions the primary viewing direction intersects the far-distance vision region; and/or
- under usual wearing conditions a progression length $LP_{10\text{-}85}$ less than or equal to 30°, the progression length being defined as the gaze direction lowering angle from the point of the main line of sight for which the optical power of the lens reaches 10% of the addition to the point of the main line of sight for which the optical power of the lens reaches 85% of the addition; and/or under usual wearing conditions, the gaze direction lowering angle from the fitting cross to the point of the main line of sight for which the optical power of the lens reaches 10% is greater than or equal to −8° and smaller than or equal to 8°; and/or under usual wearing conditions, the gaze direction lowering angle from the fitting cross to the point of the main line of for which the optical power of the lens reaches 85% is smaller than or equal to 34°; and/or under usual wearing conditions, the local variation of power gradients has a minimum along the main line of sight between the gaze direction of the main line of sight for which the optical power of the lens reaches 10% of the addition of the lens and the gaze direction of the main line of sight for which the optical power of the lens reaches 85%, the minimum being at least three time smaller than $0.75*Add/LP_{10-85}$, with Add the addition of the progressive multifocal lens and $LP_{10-85}$ the gaze direction lowering angle from the point of the main line of sight for which the optical power of the lens reaches 10% of the addition to the point of the main line of sight for which the optical power of the lens reaches 85% of the addition; and/or under usual wearing conditions, the main line of sight comprises a stabilized section along which the optical power varies of less than Add/8, with Add the addition of the progressive multifocal lens, the stabilized section having length greater than or equal to $LP_{10-85}/4$, with $LP_{10-85}$ the progression length defined as the gaze direction lowering angle from the point of the main line of sight for which the optical power of the lens reaches 10% of the addition to the point of the main line of sight for which the optical power of the lens reaches 85% of the addition; and/or under usual wearing conditions, the width between the iso-unwanted astigmatic lines representing 0.5 D has a maximum Wmax value between the point of the main line of sight for which the optical power of the lens reaches 25% of the addition to the point of the main line of sight for which the optical power of the lens reaches 85% of the addition, Wmax being greater than or equal to $LP_{10-85}/Add$, with $LP_{10-85}$ the gaze direction lowering angle from the point of the main line of sight for which the optical power of the lens reaches 10% of the addition to the point of the main line of sight for which the optical power of the lens reaches 85% of the addition and Add the addition of the progressive multifocal lens; and/or under usual wearing conditions, the width between the iso-unwanted astigmatic lines representing 0.5 D at the fitting cross is greater than or equal to LP10-85/Add, with LP10-85 the gaze direction lowering angle from the point of the main line of sight for which the optical power of the lens reaches 10% of the addition to the point of the main line of sight for which the optical power of the lens reaches 85% of the addition and Add the addition of the progressive multifocal lens; and/or under usual wearing conditions, the width between the iso-unwanted astigmatic lines representing 0.5 D at the point of the main line of sight for which the optical power of the lens reaches 100% of the addition is greater than or equal to LP10-85 Add, with LP10-85 the gaze direction lowering angle from the point of the main line of sight for which the optical power of the lens reaches 10% of the addition to the point of the main line of sight for which the optical power of the lens reaches 85% of the addition and Add the addition of the progressive multifocal lens; and/or the first major surface serves as a prescription surface, said first major surface comprising a multifocal surface without point symmetry of axial symmetry; and/or the intermediate vision region is individually optimized to provide an additional optical functionality based at least on wearer parameter; and/or the position and/or the length and/or the mean optical power of the intermediate vision region is individually optimized according to the wearer parameter; and/or the progressive multifocal lens is an ophthalmic spectacle lens.

The invention also relates to a method of determining a progressive multifocal lens according to the invention, the method comprising:

a wearer data receiving step, during which wearer data comprising at least the wearer's prescription is received at a lens determining side from a lens ordering side, the wearer data further comprise data relating to the activity or behavior the wearer carries out when seeking at intermediate distances, a surface parameter determining step, during which the parameters defining the first and second major surfaces of the progressive multifocal lens are determined based at least on the wearer data, the parameters defining the intermediate distance vision region being determined based on the activity of the wearer when seeking at intermediate distances, a surface parameter sending step, during which the surface parameters determined during the surface parameter determining step are sent to a lens manufacturing side so as to have a progressive multifocal lens manufactured.

According to further embodiments which can be considered alone or in combination:

during the surface parameter determining step, the position and/or the length and/or the mean optical power of the intermediate vision region is individually optimized according to the wearer data; and/or the progressive multifocal lens is identified by an optical function, the first major surface is defined by a first equation and the second major surface is defined by a second equation, the surface determination step further comprises:

a generating step, in which a virtual optical system is used to generate a virtual function;

a modification step, in which the virtual function is modified so as obtain the optical function;

a calculation step, in which the first and second equation are calculated from the optical function; and/or the surface determining step further comprises:

an initial surface providing step, during which an initial surface Sini associated with an first coordinate system is provided, said initial surface Sini comprising a plurality of surface points P1, each surface point P1 having a mean sphere Sph(P1) and a cylinder Cyl (P1), said initial surface Sini providing said initial dioptric function, a modifying surface selection step, during which a modifying surfaces Smod is selected, the modifying surfaces being associated with a second coordinate system, the modifying surface Smodi comprising a plurality of surface points P1, . . . , Pm, each surface point Pi having a mean sphere Sph(Pi) and a cylinder Cyl(Pi), i and m being integers with, 1≤i≤m, and m≥1, an orientation step, during which the relative position and orientation of the first coordinate system and the second coordinate system is determined, a combining step, during which the initial surface Sini and the modifying surface are combined to obtain a functionalized ophthalmic lens surface; and/or the wearer data further comprise geometrical data relating to a selected spectacle frame, and the method further comprises an edging parameter determining step during which the edging parameter of the progressive multifocal lens are determined so as to fit the selected spectacle frame; and/or the method further comprises a manufacturing step during which the progressive multifocal lens is manufactured; and/or the method further comprises a edging step during which the manufactured progressive multifocal lens is edged.

According to a further aspect, the invention relates to a computer program product comprising one or more stored sequences of instructions that are accessible to a processor and which, when executed by the processor, causes the processor to carry out the steps of the method according to the invention.

The invention further relates to a computer readable medium carrying one or more sequences of instructions of the computer program product according to the invention.

Furthermore, the invention relates to a program which makes a computer execute the method of the invention.

The invention also relates to a computer-readable storage medium having a program recorded thereon; where the program makes the computer execute the method of the invention.

The invention further relates to a device comprising a processor adapted to store one or more sequence of instructions and to carry out at least one of the steps of the method according to the invention.

BRIEF DESCRIPTION OF THE DRAWINGS

Other features and advantages of the present invention will become apparent from the following description of non-limitative embodiments, with reference to the attached drawing in which:

FIG. 4 illustrates the local sphere along any axis;

FIGS. 5 and 6 show referential defined with respect to micro-markings, for a surface bearing micro-markings and for a surface not bearing the micro-markings respectively;

Figure 1A:
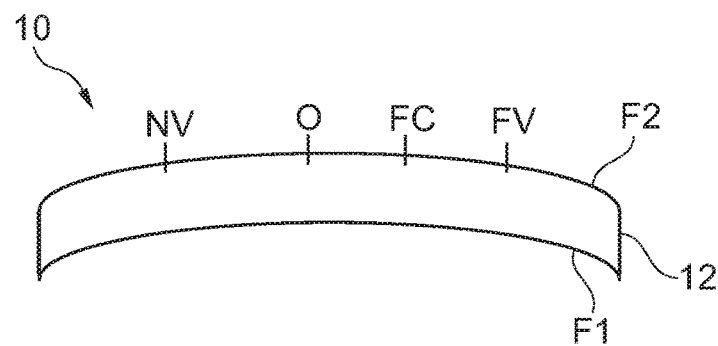
FIGS. 1A to 1D are illustrations of a progressive ophthalmic lens according to the invention.

Various aspects are now described with reference to the drawings, wherein like reference numerals are used to refer to like elements throughout. In the following description, for purposes of explanation, numerous specific details are set forth in order to provide a more thorough understanding of one or more aspects. It is evident, however, that such aspects can be practiced without these specific details. In other instances, structures and devices are shown in block diagram form in order to facilitate describing one or more aspects.

Elements in the figures are illustrated for simplicity and clarity and have not necessarily been drawn to scale. For example, the dimensions of some of the elements in the figure may be exaggerated relative to other elements to help improve the understanding of the embodiments of the present invention.

DETAILED DESCRIPTION OF EMBODIMENTS OF THE INVENTION

In the context of the present invention the term "ophthalmic lens" can refer to an uncut lens, a semi-finished lens, or a spectacle lens adapted for a wearer.

As represented on FIG. 1A an progressive multifocal lens 10 has a first major surface F1 band a second major surface F2. The first and second major surfaces are connected by an external periphery surface 12.

Between the first and second major surfaces, a refringent transparent medium is constituted which is usually homogenous. The lens can be a finished spectacles eyeglass, the two surfaces F1 and F2 of which have definitive shapes.

At least one of the first or second major surfaces, preferably both, is non-rotationally symmetrical aspheric surfaces, for instance but not limited to, progressive surface, regressive surface, toric or atoric surfaces.

As is known, a minimum curvature $CURV_{min}$ is defined at any point on an aspherical surface by the formula:

$$CURV_{min} = \frac{1}{R_{max}}$$

where $R_{max}$ is the local maximum radius of curvature, expressed in meters and $CURV_{min}$ is expressed in dioptres.

Similarly, a maximum curvature $CURV_{max}$ can be defined at any point on an aspheric surface by the formula:

$$CURV_{max} = \frac{1}{R_{min}}$$

where $R_{min}$ is the local minimum radius of curvature, expressed in meters and $CURV_{max}$ is expressed in dioptres.

It can be noticed that when the surface is locally spherical, the local minimum radius of curvature $R_{min}$ and the local maximum radius of curvature $R_{max}$ are the same and, accordingly, the minimum and maximum curvatures $CURV_{min}$ and $CURV_{max}$ are also identical. When the surface is aspherical, the local minimum radius of curvature $R_{min}$ and the local maximum radius of curvature $R_{max}$ are different.

From these expressions of the minimum and maximum curvatures $CURV_{min}$ and $CURV_{max}$, the minimum and maximum spheres labeled $SPH_{min}$ and $SPH_{max}$ can be deduced according to the kind of surface considered.

When the surface considered is the object side surface (also referred to as the front surface), the expressions are the following:

$$SPH_{min} = (n-1)*CURV_{min} = \frac{n-1}{R_{max}} \text{ and}$$

$$SPH_{max} = (n-1)*CURV_{max} = \frac{n-1}{R_{min}}$$

where n is the index of the constituent material of the lens.

If the surface considered is an eyeball side surface (also referred to as the back surface), the expressions are the following:

$$SPH_{min} = (1-n)*CURV_{min} = \frac{1-n}{R_{max}} \text{ and}$$

$$SPH_{max} = (1-n)*CURV_{max} = \frac{1-n}{R_{min}}$$

where n is the index of the constituent material of the lens.

As is well known, a mean sphere $SPH_{mean}$ at any point on an aspherical surface can also be defined by the formula:

$$SPH_{mean} = \frac{1}{2}(SPH_{min} + SPH_{max})$$

The expression of the mean sphere therefore depends on the surface considered:

if the surface is the object side surface, $$SPH_{mean} = \frac{n-1}{2}\left(\frac{1}{R_{min}} + \frac{1}{R_{max}}\right)$$

if the surface is an eyeball side surface, $$SPH_{mean} = \frac{1-n}{2}\left(\frac{1}{R_{min}} + \frac{1}{R_{max}}\right)$$

A cylinder CYL is also defined by the formula $CYL=|SPH_{max}-SPH_{min}|$.

The characteristics of any aspherical face of the lens may be expressed by the local mean spheres and cylinders. A surface can be considered as locally aspherical when the cylinder is at least 0.25 diopters.

Figure 2:
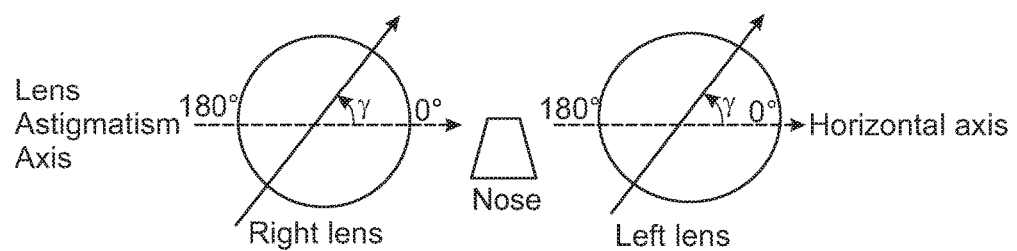
FIG. 2 illustrates the astigmatism axis γ of a lens in the TABO convention.
Figure 3:
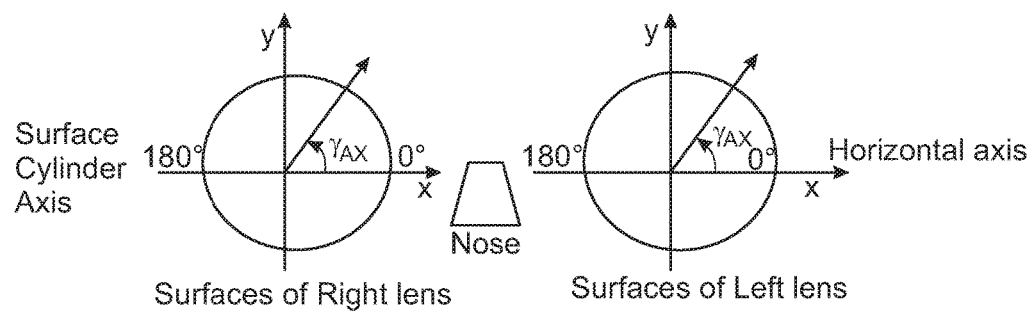
FIG. 3 illustrates the cylinder axis $\gamma_{AX}$ in a convention used to characterize an aspherical surface.

For an aspherical surface, a local cylinder axis $\gamma_{AX}$ may further be defined. FIG. 2 illustrates the astigmatism axis γ as defined in the TABO convention and FIG. 3 illustrates the cylinder axis $\gamma_{AX}$ in a convention defined to characterize an aspherical surface.

The cylinder axis $\gamma_{AX}$ is the angle of the orientation of the maximum curvature $CURV_{max}$ with relation to a reference axis and in the chosen sense of rotation. In the above defined convention, the reference axis is horizontal (the angle of this reference axis is 0°) and the sense of rotation is counterclockwise for each eye, when looking at the wearer) ($0 \leq \gamma_{AX} \leq 180°$). An axis value for the cylinder axis $\gamma_{AX}$ of +45° therefore represents an axis oriented obliquely, which when looking at the wearer, extends from the quadrant located up on the right to the quadrant located down on the left.

A surface may thus be locally defined by a triplet constituted by the maximum sphere $SPH_{max}$, the minimum sphere $SPH_{min}$ and the cylinder axis $\gamma_{AX}$. Alternatively, the triplet may be constituted by the mean sphere $SPH_{mean}$, the cylinder CYL and the cylinder axis $\Gamma_{AX}$.

Figure 7:
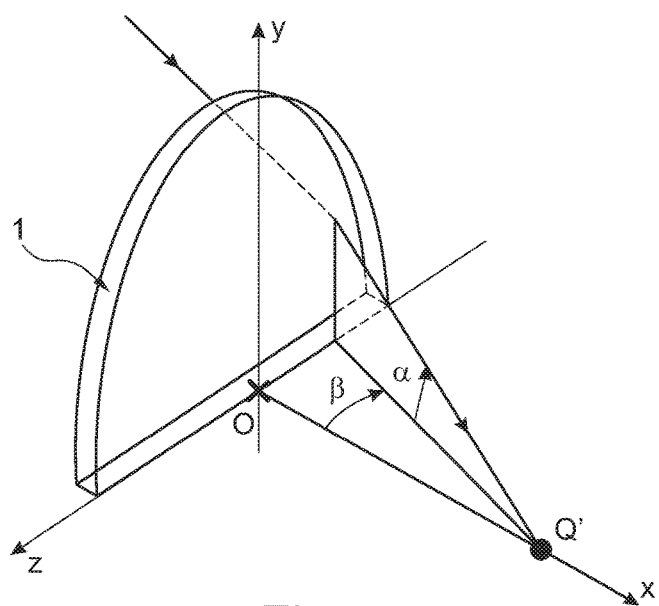
FIGS. 7 and 8 show, diagrammatically, optical systems of eye and lens.

Whenever a lens is characterized by reference to one of its aspherical surfaces, a referential is defined with respect to micro-markings as illustrated in FIGS. 6 and 7, for a surface bearing micro-markings and for a surface not bearing the micro-markings respectively.

Progressive lenses comprise micro-markings that have been made mandatory by a harmonized standard ISO 8980-2. Temporary markings may also be applied on the surface of the lens, indicating diopter measurement positions (sometimes referred to as control points) on the lens, such as for far vision and for near vision, a prism reference point and a fitting cross for instance. It should be understood that what is referred to herein by the terms far vision diopter measurement position ("FV position") and near vision diopter measurement position ("NV position") can be any one of the points included in the orthogonal projection on the first surface of the lens, of respectively the FV and NV temporary markings provided by the lens manufacturer. If the temporary markings are absent or have been erased, it is always possible for a skilled person to position such control points on the lens by using a mounting chart and the permanent micro-markings.

The micro-markings also make it possible to define referential for both surfaces of the lens.

FIG. 5 shows the referential for the surface bearing the micro-markings. The center of the surface (x=0, y=0) is the point of the surface at which the normal N to the surface intersects the center of the segment linking the two micro-markings. MG is the collinear unitary vector defined by the two micro-markings. Vector Z of the referential is equal to the unitary normal (Z=N); vector Y of the referential is equal to the vector product of Z by MG; vector X of the referential is equal to the vector product of Y by Z. {X, Y, Z} thereby form a direct orthonormal trihedral. The center of the referential is the center of the surface x=0 mm, y=0 mm. The X axis is the horizontal axis and the Y axis is the vertical axis as it shown in FIG. 3.

FIG. 6 shows the referential for the surface opposite to the surface bearing the micro-markings. The center of this second surface (x=0, y=0) is the point at which the normal N intersecting the center of the segment linking the two micro-markings on the first surface intersects the second surface. Referential of the second surface is constructed the same way as the referential of the first surface, i.e. vector Z is equal to the unitary normal of the second surface; vector Y is equal to the vector product of Z by MG; vector X is equal to the vector product of Y by Z. As for the first surface, the X axis is the horizontal axis and the Y axis is the vertical axis as it shown in FIG. 3. The center of the referential of the surface is also x=0 mm, y=0 mm.

Similarly, on a semi-finished lens blank, standard ISO 10322-2 requires micro-markings to be applied. The center of the aspherical surface of a semi-finished lens blank can therefore be determined as well as a referential as described above.

Moreover, a progressive multifocal lens may also be defined by optical characteristics, taking into consideration the situation of the person wearing the lenses.

Figure 8:
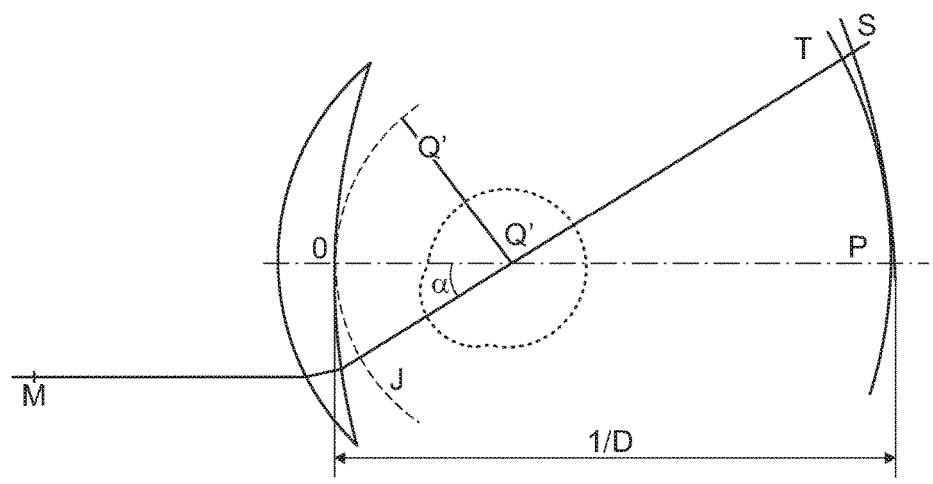

FIGS. 7 and 8 are diagrammatic illustrations of optical systems of eye and lens, thus showing the definitions used in the description. More precisely, FIG. 7 represents a perspective view of such a system illustrating parameters α and β used to define a gaze direction. FIG. 8 is a view in the vertical plane parallel to the antero-posterior axis of the wearer's head and passing through the center of rotation of the eye in the case when the parameter β is equal to 0.

The center of rotation of the eye is labeled Q'. The axis Q'F', shown on FIG. 8 in a dot-dash line, is the horizontal axis passing through the center of rotation of the eye and extending in front of the wearer—that is the axis Q'F' corresponding to the primary gaze view. This axis cuts the aspherical surface of the lens on a point called the fitting cross, which is present on lenses to enable the positioning of lenses in a frame by an optician. The point of intersection of the rear surface of the lens and the axis Q'F' is the point O. O can be the fitting cross if it is located on the rear surface. An apex sphere, of center Q', and of radius q', is tangential to the rear surface of the lens in a point of the horizontal axis. As examples, a value of radius q' of 25.5 mm corresponds to a usual value and provides satisfying results when wearing the lenses.

A given gaze direction—represented by a solid line on FIG. 7—corresponds to a position of the eye in rotation around Q' and to a point J of the apex sphere; the angle β is the angle formed between the axis Q'F' and the projection of the straight line Q'J on the horizontal plane comprising the axis Q'F'; this angle appears on the scheme on FIG. 7. The angle α is the angle formed between the axis Q'J and the projection of the straight line Q'J on the horizontal plane comprising the axis Q'F'; this angle appears on the scheme on FIGS. 7 and 8. A given gaze view thus corresponds to a point J of the apex sphere or to a couple (α, β). The more the value of the lowering gaze angle is positive, the more the gaze is lowering and the more the value is negative, the more the gaze is rising.

In a given gaze direction, the image of a point M in the object space, located at a given object distance, is formed between two points S and T corresponding to minimum and maximum distances JS and JT, which would be the sagittal and tangential local focal lengths. The image of a point in the object space at infinity is formed, at the point F'. The distance D corresponds to the rear frontal plane of the lens.

Ergorama is a function associating to each gaze direction the usual distance of an object point. Typically, in far vision following the primary gaze direction, the object point is at infinity. In near vision, following a gaze direction essentially corresponding to an angle α of the order of 35° and to an angle β of the order of 5° in absolute value toward the nasal side, the object distance is of the order of 30 to 50 cm. For more details concerning a possible definition of an ergorama, U.S. Pat. No. 6,318,859 may be considered. This document describes an ergorama, its definition and its modeling method. For a method of the invention, points may be at infinity or not. Ergorama may be a function of the wearer's ametropia.

Using these elements, it is possible to define a wearer optical power and astigmatism, in each gaze direction. An object point M at an object distance is considered for a gaze direction (α,β). An object proximity ProxO is defined for the point M on the corresponding light ray in the object space as the inverse of the distance MJ between point M and point J of the apex sphere:

ProxO=1/MJ

This enables to calculate the object proximity within a thin lens approximation for all points of the apex sphere. For a real lens, the object proximity can be considered as the inverse of the distance between the object point and the front surface of the lens, on the corresponding light ray.

For the same gaze direction (α,β), the image of a point M having a given object proximity is formed between two points S and T which correspond respectively to minimal and maximal focal distances (which would be sagittal and tangential focal distances). The quantity ProxI is called image proximity of the point M:

$$ProxI = \frac{1}{2}\left(\frac{1}{JT} + \frac{1}{JS}\right)$$

By analogy with the case of a thin lens, it can therefore be defined, for a given gaze direction and for a given object proximity, i.e. for a point of the object space on the corresponding light ray, an optical power Pui as the sum of the image proximity and the object proximity.

Pui=ProxO+ProxI

With the same notations, an astigmatism Ast is defined for every gaze direction and for a given object proximity as:

$$Ast = \left|\frac{1}{JT} - \frac{1}{JS}\right|$$

This definition corresponds to the astigmatism of a ray beam created by the lens. It can be noticed that the definition gives, in the primary gaze direction, the classical value of astigmatism. The astigmatism angle, usually called axis, is the angle γ. The angle γ is measured in the frame $\{Q', x_m, y_m, z_m\}$ linked to the eye. It corresponds to the angle with which the image S or T is formed depending on the convention used with relation to the direction $z_m$ in the plane $\{Q', z_m, y_m\}$.

Possible definitions of the optical power and the astigmatism of the lens, in the wearing conditions, can thus be calculated as explained in the article by B. Bourdoncle et al., entitled "Ray tracing through progressive ophthalmic lenses", 1990 International Lens Design Conference, D. T. Moore ed., Proc. Soc. Photo. Opt. Instrum. Eng.

Standard or usual wearing conditions are to be understood as the position of the lens with relation to the eye of a standard wearer, notably defined with the fitting cross intersecting the primary viewing direction, a distance between the center of rotation of the eye and the first major surface of the lens of 25.5 mm, a pantoscopic angle of 8° and a wrap angle of 0°.

The pantoscopic angle is the angle in the vertical plane between the optical axis of the spectacle lens and the visual axis of the eye in the primary position, usually taken to be the horizontal.

The wrap angle is the angle in the horizontal plane between the optical axis of the spectacle lens and the visual axis of the eye in the primary position, usually taken to be the horizontal.

Other conditions may be used. Wearing conditions may be calculated from a ray-tracing program, for a given lens. Further, the optical power and the astigmatism may be calculated so that the prescription is either fulfilled at the reference points (i.e control points in far vision) and for a wearer wearing his spectacles in the wearing conditions or measured by a frontofocometer.

Figure 9:
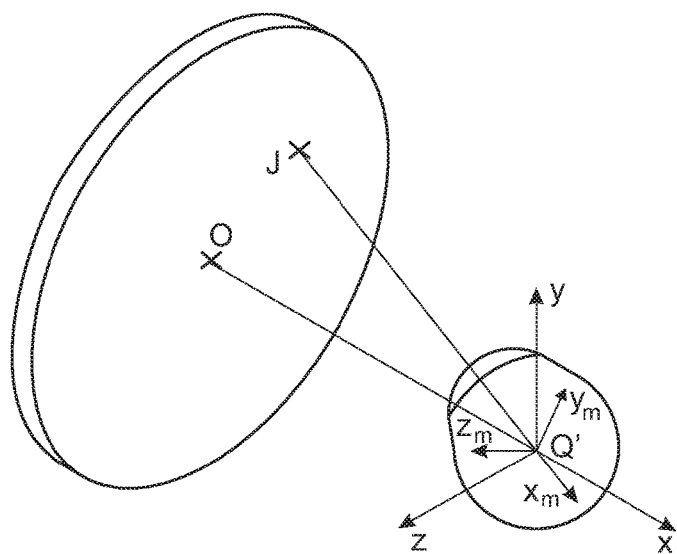
FIG. 9 shows a ray tracing from the center of rotation of the eye.

FIG. 9 represents a perspective view of a configuration wherein the parameters α and β are non zero. The effect of rotation of the eye can thus be illustrated by showing a fixed frame $\{x, y, z\}$ and a frame $\{x_m, y_m, z_m\}$ linked to the eye.

Frame {x, y, z} has its origin at the point Q'. The axis x is the axis Q'O and it is oriented from the lens toward the eye. The y axis is vertical and oriented upwardly. The z axis is such that the frame {x, y, z} be orthonormal and direct. The frame $\{x_m, y_m, z_m\}$ is linked to the eye and its center is the point Q'. The $x_m$ axis corresponds to the gaze direction JQ'. Thus, for a primary gaze direction, the two frames {x, y, z} and $\{x_m, y_m, z_m\}$ are the same. It is known that the properties for a lens may be expressed in several different ways and notably in surface and optically. A surface characterization is thus equivalent to an optical characterization. In the case of a blank, only a surface characterization may be used. It has to be understood that an optical characterization requires that the lens has been machined to the wearer's prescription. In contrast, in the case of an ophthalmic lens, the characterization may be of a surface or optical kind, both characterizations enabling to describe the same object from two different points of view. Whenever the characterization of the lens is of optical kind, it refers to an ergorama-eye-lens system. For simplicity, the term 'lens' is used in the description but it has to be understood as the 'ergorama-eye-lens system'. The value in surface terms can be expressed with relation to points. The points are located with the help of abscissa or ordinate in a frame as defined above with respect to FIGS. 3, 5 and 6.

The values in optic terms can be expressed for gaze directions. Gaze directions are usually given by their degree of lowering and azimuth in a frame whose origin is the center of rotation of the eye. When the lens is mounted in front of the eye, a point called the fitting cross is placed before the pupil or before the eye rotation center Q' of the eye for a primary gaze direction. The primary gaze direction corresponds to the situation where a wearer is looking straight ahead. In the chosen frame, the fitting cross corresponds thus to a lowering angle α of 0° and an azimuth angle β of 0° whatever surface of the lens the fitting cross is positioned—rear surface or front surface.

The above description made with reference to FIGS. 7-9 was given for central vision. In peripheral vision, as the gaze direction is fixed, the center of the pupil is considered instead of center of rotation of the eye and peripheral ray directions are considered instead of gaze directions. When peripheral vision is considered, angle α and angle β correspond to ray directions instead of gaze directions.

In the remainder of the description, terms like «up», «bottom», «horizontal», «vertical», «above», «below», «front», «rear» or other words indicating relative position may be used. These terms are to be understood in the wearing conditions of the lens.

Notably, the "upper" part of the lens corresponds to a negative lowering angle α<0° and the "lower" part of the lens corresponds to a positive lowering angle α>0°. Similarly, the "upper" part of the surface of a lens—or of a semi-finished lens blank—corresponds to a positive value along the y axis, and preferably to a value along the y axis superior to the y_value at the fitting cross and the "lower" part of the surface of a lens—or of a semi-finished lens blank—corresponds to a negative value along the y axis in the frame as defined above with respect to FIGS. 3, 6 and 7, and preferably to a value along the y axis inferior to the y_value at the fitting cross.

Figure 1B:
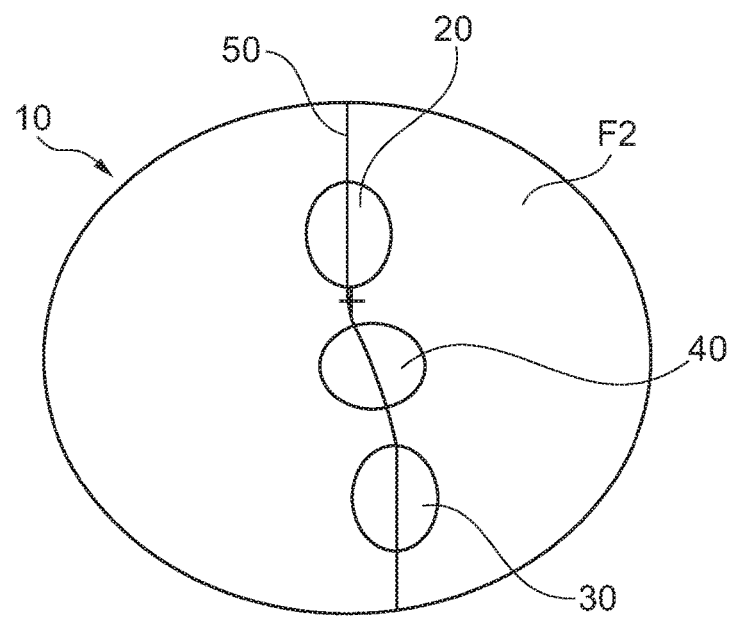

As illustrated on FIG. 1B, the progressive multifocal ophthalmic lens according to the invention comprises:
a far distance vision region 20,
a near distance vision region 30,
a intermediate distance vision region 40, and
a main line of sight 50 extending from the far-distance vision region 20 to the near-distance vision 30 and passing through the intermediate-distance vision region 40.

The far distance vision region has a first progressive power adapted to provide the wearer a clear vision at far distance vision.

The near distance vision region has a second progressive power adapted to provide the wearer a clear vision at near distance vision.

The intermediate distance vision region has a second progressive power adapted to provide the wearer a clear vision at intermediate distance vision.

A first progressive region joins the far-distance vision region 20 and the intermediate-distance vision region 40 and the second progressive region joins the intermediate-distance vision region 40 and the near-distance vision region 30.

According to an embodiment of the invention, the main light of sight 50 corresponds to the meridian line of the progressive multifocal lens.

For the purpose of the invention, the meridian line 50 of a progressive multifocal lens is defined as follow: for each lowering of the view of an angle $\alpha=\alpha_1$ between the gaze direction corresponding to the fitting cross and a gaze direction being in the near vision region, the gaze direction $(\alpha_1, \beta_1)$ is searched for which the local residual astigmatism is minimum. Thus, all the gaze directions defined in that way form the meridian line of the ergorama-eye-lens system. The meridian line of the lens represents the locus of mean gaze directions of a wearer when he is looking from far to near visions. The meridian line of a surface of the lens is defined as follows: each gaze direction (α,β) belonging to the optical meridian line of the lens intersects the surface at a point (x, y). The meridian line of the surface is the set of points corresponding to the gaze directions of the meridian line of the lens.

Figure 1C:
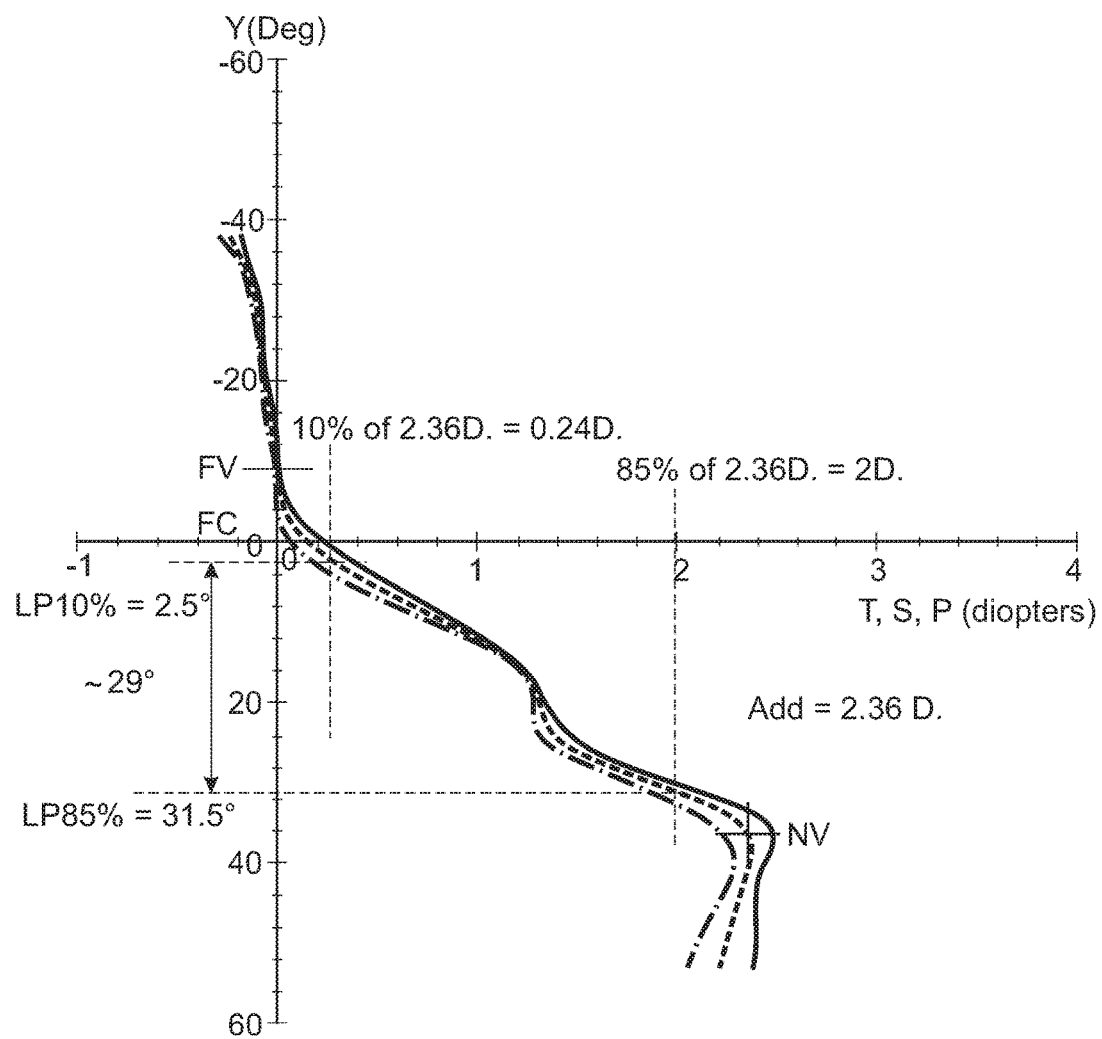

FIG. 1C shows the mean refractive power along the meridian line 50 of an progressive multifocal ophthalmic lens according to the invention. The x-axes are graduated in diopters ant the y-axis give the height, in degrees of the progressive multifocal ophthalmic lens according to the invention.

As illustrated on FIG. 1C, the far, near and intermediate distance vision regions may comprise sections along the meridian line of stabilized refractive power. Advantageously, such stabilized area increasing the visual comfort of the wearer when using the progressive ophthalmic lens, in particular when using the progressive multifocal lens for seeking a far, near and intermediate distances.

A section is to be considered as stabilized when the refractive power has a slope smaller than or equal to greater than 0.02 D/°, for example smaller than or equal to 0.01 D/°.

According to an embodiment, the progressive multifocal ophthalmic lens is arranged so that under usual wearing conditions the primary viewing direction intersects the far distance vision region. Furthermore, the refractive power at primary viewing direction corresponds to the refractive power prescribed for the wearer at far distance vision.

Advantageously, such configuration increases the visual comfort of the wearer.

According to an embodiment of the invention, under usual wearing conditions, the gaze direction lowering angle from the fitting cross to the point of the meridian line for which the optical power of the lens reaches 10% of the addition Add of the progressive multifocal lens is greater than or equal to −8°, for example greater than or equal to 0° and smaller than or equal to 8°, for example smaller than or equal to 4°.

The addition Add of the progressive multifocal lens may be defined as the difference of refractive power between the far distance vision direction and the near distance vision direction.

Advantageously, such configuration provides a large and long far distance vision region, thus increasing the visual comfort of the wearer when seeking at far distances.

On the example of FIG. 1C, the gaze direction lowering angle from the fitting cross to the point of the meridian line for which the optical power of the lens reaches 10% of the addition Add of the progressive multifocal lens is around 2.5°.

According to an embodiment of the invention, under usual wearing conditions, the gaze direction lowering angle from the fitting cross to the point of the meridian line of for which the optical power of the lens reaches 85% of the addition Add of the progressive multifocal lens is smaller than or equal to 34°, for example smaller than or equal to 28° and greater than or equal to 20°.

Advantageously, such configuration provides that the wearer does not need to lower his vision to much to reach the near distance vision region, thus increasing the visual comfort of the wearer when seeking at near distances.

On the example of FIG. 1C, the gaze direction lowering angle from the fitting cross to the point of the meridian line of for which the optical power of the lens reaches 85% of the addition Add of the progressive multifocal lens is around 31.5°.

According to an embodiment of the invention, under usual wearing conditions the progression length $LP_{10-85}$ of the progressive multifocal ophthalmic lens is smaller than or equal to 30°, for example smaller than or equal to 25°.

The progression length $LP_{10-85}$ of the progressive multifocal ophthalmic lens is defined as the gaze direction lowering angle from the point of the meridian line for which the optical power of the lens reaches 10% of the addition of the progressive multifocal ophthalmic lens to the point of the meridian line for which the optical power of the lens reaches 85% of the addition of the progressive multifocal ophthalmic lens.

Advantageously, such configuration provides that the angular distance between the near and far distance vision regions is not to great, thus increasing the visual comfort of the wearer when seeking from far to near distances and vis-versa.

On the example of FIG. 1C, the progression length $LP_{10-85}$ of the progressive multifocal ophthalmic lens is a about 29°.

According to an embodiment of the invention, the progression length $LP_{10-85}$ comprises the intermediate distance vision region.

Figure 10:
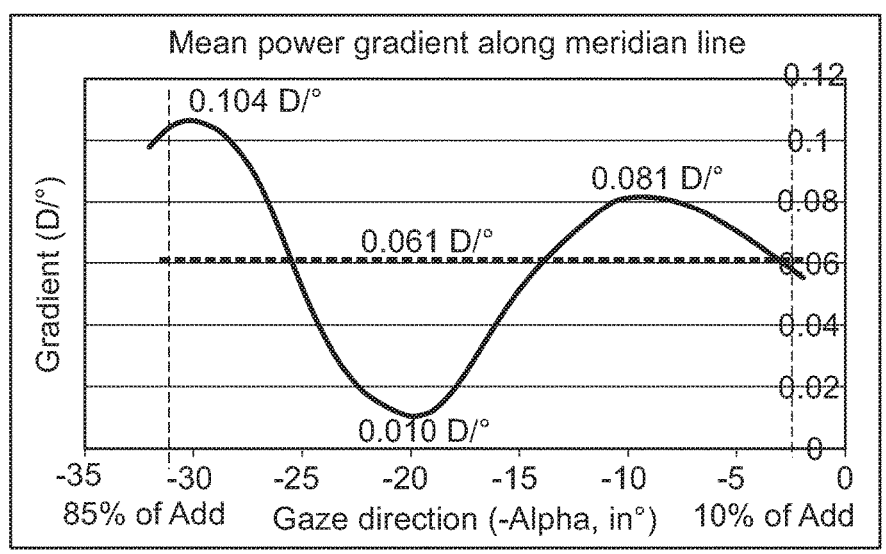
FIG. 10 illustrates the mean power gradient along the meridian line of a progressive multifocal ophthalmic lens according to the invention.

FIG. 10 represents the mean power gradient along the meridian line of an ophthalmic lens according to an embodiment of the invention.

As illustrated on FIG. 10, the progressive multifocal ophthalmic lens comprises at least an intermediate section of the main line of sight along which the mean power gradient has at least two maximum MAX1 and MAX2.

The two maximum MAX 1 and MAX 2 are smaller or equal to 1.75 time the mean value of power gradient over the section of the main line of sight comprised between the point of the main line of sight for which the optical power of the lens reaches 10% of the addition of the lens to the point of the main line of sight for which the optical power of the lens reaches 85% of the addition.

On the example of FIG. 10, the first maximum MAX1 of the mean power gradient is around 1.04 D/°, the second maximum MAX2 of the mean power gradient is around 0.081 D/°, the mean value of power gradient over the section of the main line of sight comprised between the point of the main line of sight for which the optical power of the lens reaches 10% of the addition of the lens to the point of the main line of sight for which the optical power of the lens reaches 85% of the addition is around 0.061 D/°.

Therefore, both maximum are smaller than 0.107 D/° corresponding to 1.75 time the mean value of power gradient over the progression length $LP_{10-85}$.

Advantageously, limiting the maximum of gradient of optical power increases the visual comfort of the wearer, in particular when using the intermediate distance region.

The gradient of optical power may be limited by providing that for each point of the main line of sight comprised between the point of the main line of sight for which the optical power of the lens reaches 10% of the addition of the lens to the point of the main line of sight for which the optical power of the lens reaches 85% of the addition, the difference between the optical power of the lens and the linear optical power progression function is smaller than or equal to Add/4.

The limitation of the maximum of gradient power or the limitation of the difference between the gradient power and the linear optical power progression limits the optical distortion of the lens and provides an smooth transition of power all along the main line of sight, that will permit the wearer to easily adapt to the lens, while enabling an improved intermediate vision.

In particular, this limitation of the maximum of gradient power or the limitation of the difference between the gradient power and the linear optical power progression allows to propose a lens design having improved intermediate vision while keeping gradient characteristics close to standard lens design.

The linear optical power progression function is defined between the point of the main line of sight for which the optical power of the lens reaches 10% of the addition of the lens and the point of the main line of sight for which the optical power of the lens reaches 85% of the addition.

According to an embodiment of the invention, under usual wearing conditions the local variation of power gradients has a minimum along the main line of sight in the progression length $LP_{10-85}$, the minimum being at least three time smaller than $0.75*Add/LP_{10-85}$, for example at least five time smaller, with Add the addition of the progressive multifocal lens and $LP_{10-85}$ the gaze direction lowering angle from the point of the main line of sight for which the optical power of the lens reaches 10% of the addition to the point of the main line of sight for which the optical power of the lens reaches 85% of the addition. Preferably, the intermediate distance vision region comprises the local variation of power gradients minimum.

According to an embodiment the local variation of power gradients minimum may be substantially equal to zero.

Advantageously, having a small local variation of power gradients minimum along the progression length $LP_{10-85}$, provides a stabilized intermediate distance vision region, thus increasing the visual comfort of the wearer when seeking at intermediate distances.

According to an embodiment of the invention, under usual wearing conditions, the main line of sight comprises a stabilized section along which the optical power varies of less than Add/8, with Add the addition of the progressive multifocal lens. The stabilized section has a length greater than or equal to $LP_{10-85}/4$ for example grater than or equal to $LP_{10-85}/3$, with $LP_{10-85}$ the progression length defined as the gaze direction lowering angle from the point of the main line of sight for which the optical power of the lens reaches 10% of the addition to the point of the main line of sight for which the optical power of the lens reaches 85% of the addition.

Figure 1D:
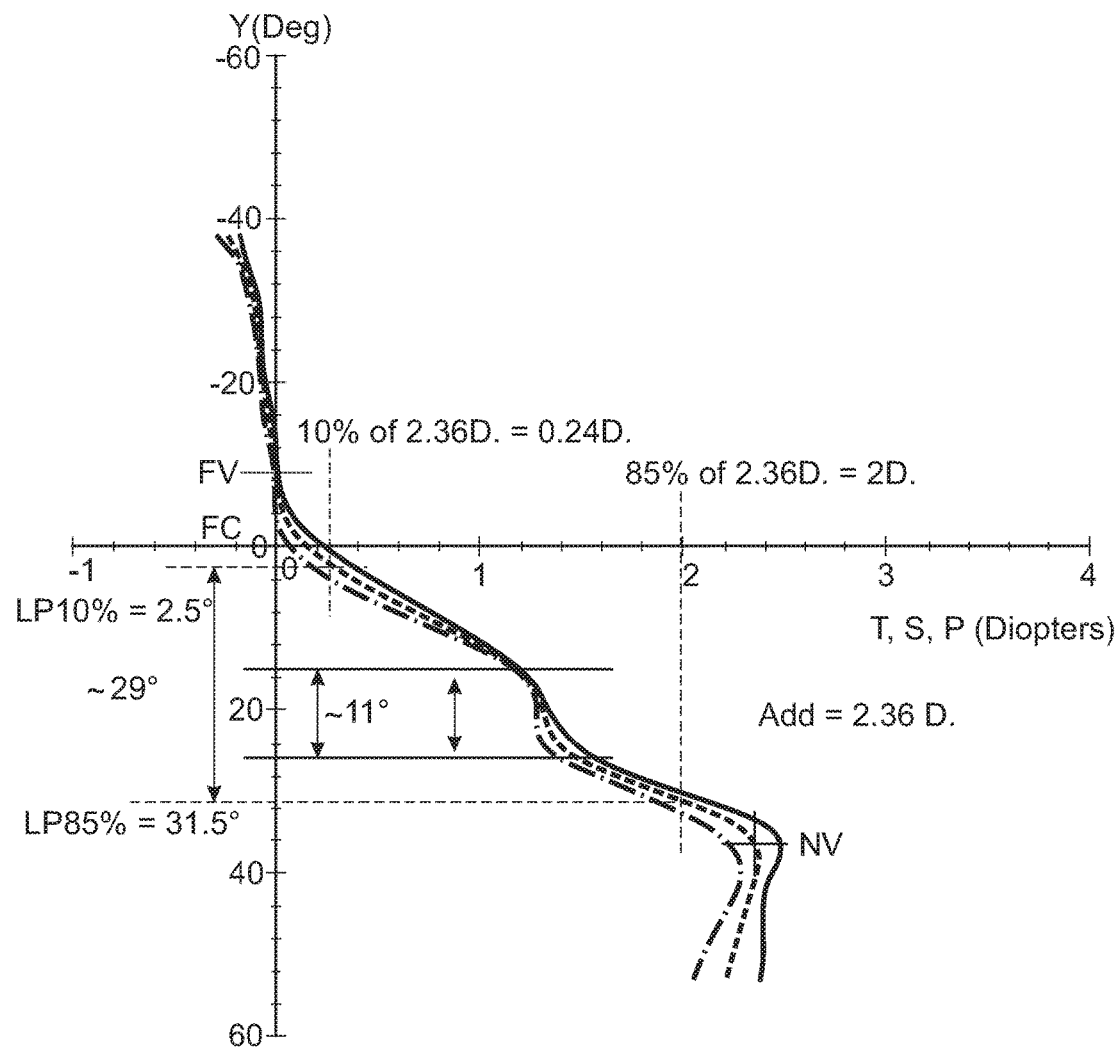

On the example of FIG. 1D, which corresponds to an progressive multifocal ophthalmic lens having an addition of 2 diopters, the stabilized section has a length of about 11°, for a progression length $LP_{10-85}$ of about 29°.

Figure 11:
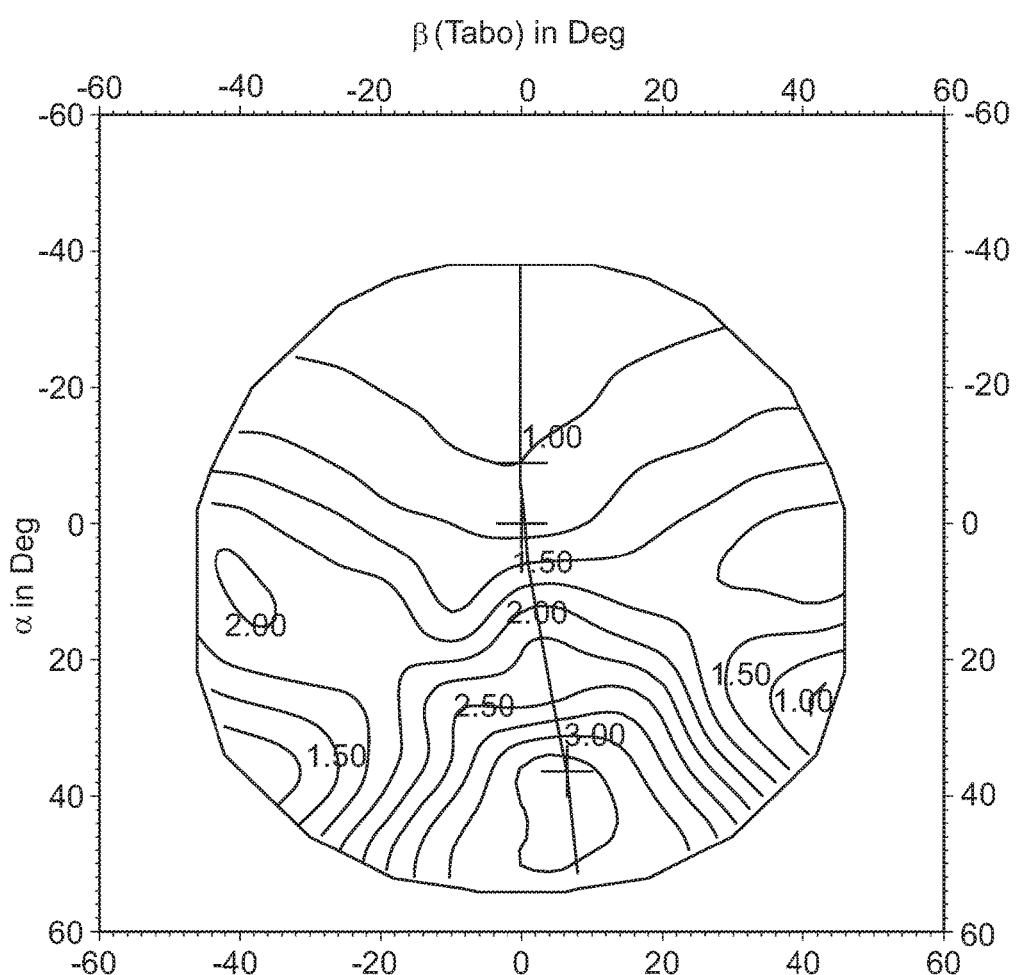
FIG. 11 represents the iso power astigmatic lines of the progressive multifocal lens of FIGS. 1C and 1D.

FIG. 11 shows iso mean power lines, i.e. lines formed by points for which the mean power has identical optical power. The x-axis and y-axis respectively give the angles [β] and [α].

Figure 12:
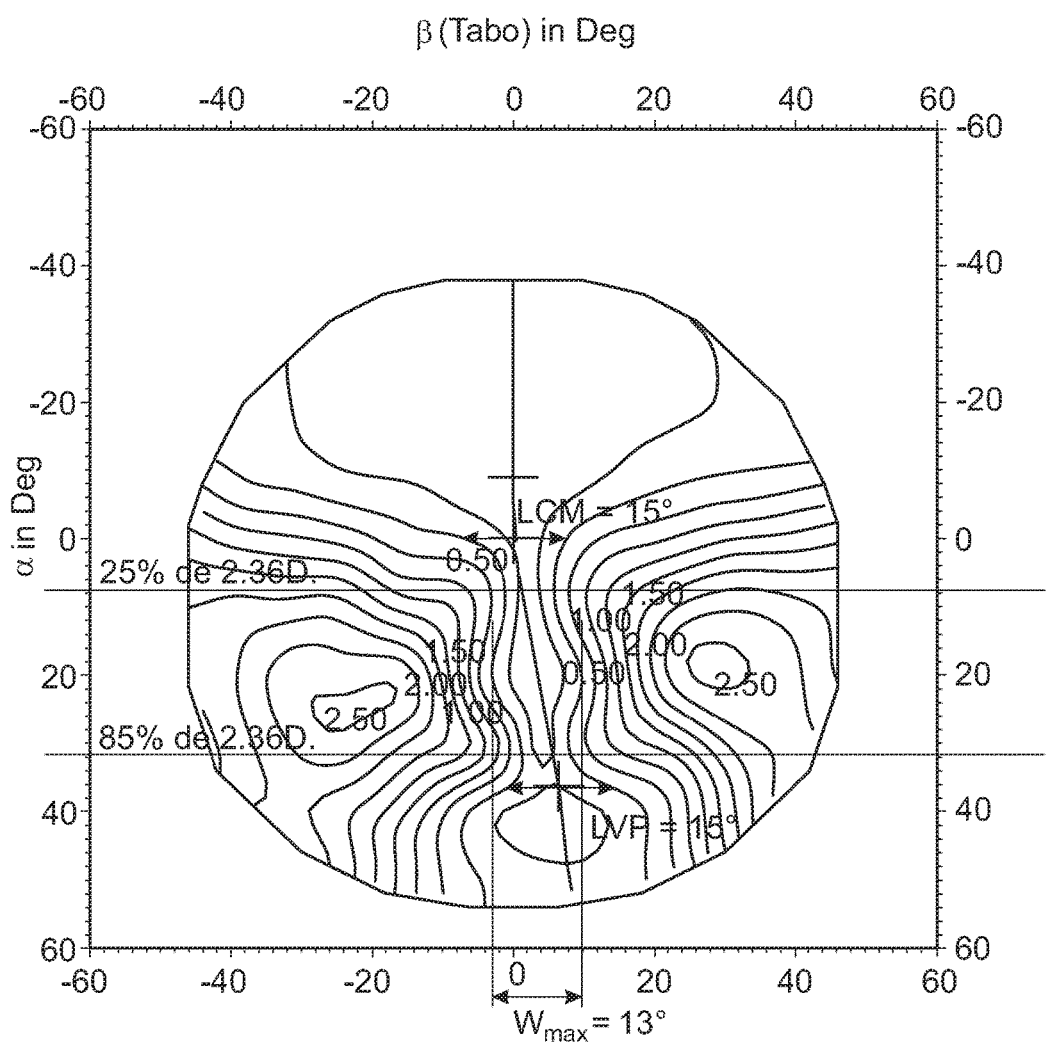
FIG. 12 represents the iso-unwanted astigmatic lines of the progressive multifocal lens of FIG. 11.

FIG. 12 shows, using the same axes as for FIG. 11, iso-unwanted astigmatic lines.

FIGS. 11 and 12 correspond to the same progressive multifocal lens as represented on FIG. 1C.

According to an embodiment of the invention, under usual wearing conditions, the width between the iso-unwanted astigmatic lines representing 0.5 D has a maximum Wmax value between the point of the main line of sight for which the optical power of the lens reaches 25% of the addition to the point of the main line of sight for which the optical power of the lens reaches 85% of the addition.

Wmax is greater than or equal to $LP_{10-85}/Add$, for example greater than $4*LP_{10-85}/(3*Add)$.

On the example of FIG. 12, Wmax is around 13° with $LP_{10-85}/Add$ around 12.28.

Advantageously, having Wmax greater than or equal to $LP_{10-85}/Add$, provides a large intermediate distance vision region, thus increasing the visual comfort of the wearer when seeking at intermediate distances.

So as to increase the visual comfort in the primary viewing direction, the progressive multifocal ophthalmic lens according to an embodiment of the invention is arranged so that under usual wearing conditions, the width between the iso-unwanted astigmatic lines representing 0.5 D at the fitting cross is greater than or equal to $LP_{10-85}/Add$, for example greater than $4*LP_{10-85}/(3*Add)$.

So as to increase the visual comfort when the wearer uses the near distance vision region, the progressive multifocal ophthalmic lens according to an embodiment of the invention is arranged so that under usual wearing conditions, the width between the iso-unwanted astigmatic lines representing 0.5 D at the point of the main line of sight for which the optical power of the lens reaches 100% of the addition of the progressive multifocal ophthalmic lens is greater than or equal to $LP_{10-85}/Add$, for example greater than $4*LP_{10-85}/(3*Add)$.

The first major surface of the progressive multifocal lens, the on closest to the wearer's eye when the lens is worn by the wearer, serves as a prescription surface. The first major surface comprising a multifocal surface without point symmetry of axial symmetry.

As for the far and near distance vision region, the intermediate distance vision region may be individually optimized to provide additional optical functionality based at least on wearer parameter. For example, the position and/or the length and/or the mean optical power of the intermediate vision region may be individually optimized according to the wearer parameter.

Figure 13:
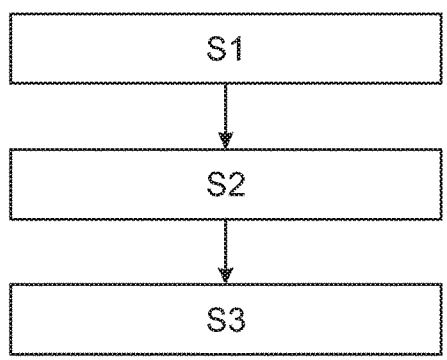
FIG. 13 is a flow chart of a method of the invention.

As illustrated on FIG. 13, the invention further relates to a method, for example implemented by computer means, of determining a progressive multifocal lens according to invention.

The method according to the invention comprises at least:
a wearer data receiving step S1,
a surface parameter determining step S2, and
a surface parameter sending step S3.

During the wearer data receiving step S1, wearer data comprising at least the wearer's prescription is received. The wearer data may further comprise data relating to the activity or behavior the wearer carries out when seeking at intermediate distances.

The parameters defining the first and second major surfaces of the progressive multifocal lens are determined during the surface parameter determining step S2. Said parameters are determined based at least on the wearer data, the parameters defining the intermediate distance vision region being determined based on the activity of the wearer when seeking at intermediate distances.

For example, the position of the intermediate distance vision region can be determined based on the direction of sight of the wearer when looking at an object at intermediate distance. The gaze direction of the wearer ($\alpha_i$, $\beta_1$) for intermediate distance can be measured by any eyetracking device that also provides visual target adapted for intermediate task, for example a text, an image, a video placed at an intermediate distance. This can be in the form of a computer displaying text and using a camera with an eyetracking software to measure the gaze direction, or in the form of an Electronic tablet or the like.

The position of the intermediate vision can be then positioned at ($\alpha_i$, $\beta_1$) position.

The third refractive power of the intermediate distance vision region may be determined based on a measurement or input of the wearer concerning the most frequent intermediate distance used by the wearer. For example, the wearer may provide the distance between him and his computer screen and the third refractive power may be adapted to such distance. This parameter may also be measured by the eyetracking device that may have means to measure the distance between the visual target and the wearer.

The size of the intermediate distance vision region may also be adapted based on the wearer data. For example based on the distance and size of the wearer's screen one may determine the vertical and horizontal dimension of the intermediate distance vision region.

One may also determine the size of the intermediate distance vision region using the eyetracking device and determine the horizontal and/or vertical range of the gazing direction when looking at the visual target adapted for intermediate task.

More generally, the type of activity carried out by the wearer when looking at intermediate distances may be used to customize the intermediate distance vision zone.

From the activity of the wearer one may determine the viewing distance, the main direction of sight, the size of the objects being observed at intermediate distance.

For example, one may ask the wearer the time he/she spends at intermediate activities, for example time spent for computing or for using a mobile phone.

The viewing distance, main direction of sight, size of object being observed may also selected from average parameters without any customization.

Furthermore, the variation of gradient power may be linked to the fact that the wearer carries out dynamic or static activities at intermediate distance vision.

According to an embodiment of the invention, the surface parameter determining step S2 may be implemented using an optimizing method.

For example, the progressive multifocal lens is identified by an optical function (OF), the first major surface is defined by a first equation (ES1) and the second major surface is defined by a second equation (ES2), the surface determination step further comprises:
- a generating step, in which a virtual optical system is used to generate a virtual function (VOF);
- a modification step, in which the virtual function is modified so as obtain the optical function (OF);
- a calculation step, in which the first and second equation are calculated from the optical function (OF).

According to an embodiment of the invention, the surface parameter determining step may further comprise:
- an initial surface providing step, during which an initial surface Sini associated with an first coordinate system is provided, said initial surface Sini comprising a plurality of surface points P1, each surface point P1 having a mean sphere Sph(P1) and a cylinder Cyl(P1), said initial surface Sini providing said initial dioptric function,
- a modifying surface selection step, during which a modifying surfaces Smod is selected, the modifying surfaces being associated with a second coordinate system, the modifying surface Smodi comprising a plurality of surface points P1, . . . , Pm, each surface point Pi having a mean sphere Sph(Pi) and a cylinder Cyl(Pi), i and m being integers with, $1 \leq i \leq m$, and $m \geq 1$,
- an orientation step, during which the relative position and orientation of the first coordinate system and the second coordinate system is determined,
- a combining step, during which the initial surface Sini and the modifying surface are combined to obtain a functionalized ophthalmic lens surface.

Advantageously, using a modifying surface allows adapting existing optical design without having to recalculate the optical design.

During the surface parameter sending step S3, the surface parameters determined during the surface parameter determining step are sent to a lens manufacturing side so as to have a progressive multifocal lens manufactured.

Figure 14:
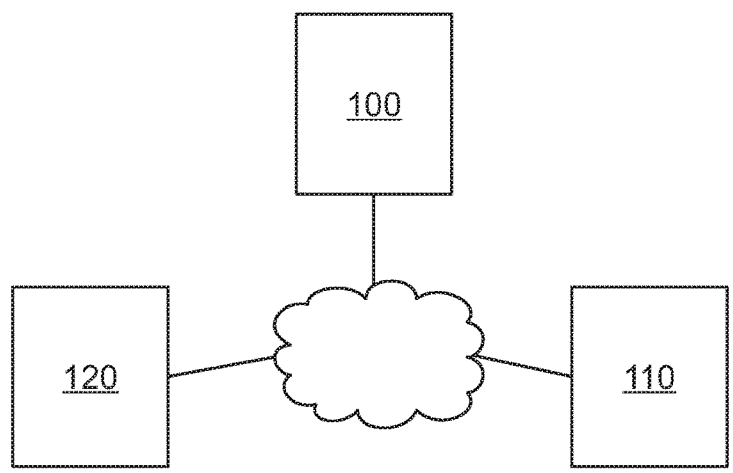
FIG. 14 represents an arrangement for implementing a method according to the invention.

As illustrated on FIG. 14, the method according to the invention may be implemented in a general arrangement according to which the progressive ophthalmic lens is ordered from a lens ordering side 100, the progressive multifocal lens is determined at a lens determining side 110 and finally the lens is manufactured at the lens manufacturing side 120. Once manufactured, the progressive multifocal lens may be sent from the lens manufacturing side to the lens ordering side.

As represented on FIG. 14, data between the lens ordering side, determining side and manufacturing side may be stored in a central storing device, such a cloud storing device. Each of sides communicate, i.e. receive and send, data to the cloud independently.

Although not represented the different sides may be configured differently and linked directly, in particular the lens determining side and manufacturing side may be located at the same location.

According to an embodiment of the invention, the wearer data further comprise geometrical data relating to a selected spectacle frame, and the method further comprises an edging parameter determining step during which the edging parameter of the progressive multifocal lens are determined so as to fit the selected spectacle frame.

The method may further comprise at the lens manufacturing side a manufacturing step and a edging step.

The invention has been described above with the aid of embodiments without limitation of the general inventive concept as defined in the claims.

Many modifications and variations will suggest themselves to those skilled in the art upon making reference to the foregoing illustrative embodiments, which are given by way of example only and which are not intended to limit the scope of the invention, that being determined solely by the appended claims.

In the claims, the word "comprising" does not exclude other elements or steps, and the indefinite article "a" or "an" does not exclude a plurality. The mere fact that different features are recited in mutually different dependent claims does not indicate that a combination of these features cannot be advantageously used. Any reference signs in the claims should not be construed as limiting the scope of the invention.

The invention claimed is:

1. A progressive multifocal lens adapted to correct a user's vision and having a first major surface and a second major surface, where the first major surface is positioned closest to the user's eye when the progressive multifocal lens is worn by the user, the progressive multifocal lens comprising:
- a far-distance vision region having a first refractive power;
- a near-distance vision region having a second refractive power;
- an intermediate-distance vision region having a third refractive power;
- a first and a second progressive region;
- a main line of sight extending from the far-distance vision region to the near-distance vision and passing through the intermediate-distance vision region,
- wherein the first progressive region joins the far-distance vision region and the intermediate-distance vision region and the second progressive region joins the intermediate-distance vision region and the near-distance vision region; and
- an intermediate section of the main line of sight along which a power gradient thereof has at least two maxima and one minimum, the two maxima being smaller or equal to 1.75 times a mean value of the power gradient over a section of the main line of sight between a point of the main line of sight for which an optical power of the lens reaches 10% of the addition of the lens to a point of the main line of sight for which the optical power of the lens reaches 85% of the addition.

2. The progressive multifocal lens according to claim 1, wherein the intermediate-distance vision region comprises an area of stabilized optical power.

3. The progressive multifocal lens according to claim 1, wherein for each point of the main line of sight between a point of the main line of sight for which an optical power of the lens reaches 10% of the addition of the lens to a point of the main line of sight for which the optical power of the lens reaches 85% of the addition, a difference between the optical power of the lens and a linear optical power progression function is smaller than or equal to Add/4, with Add being an addition of the optical lens and the linear optical power progression function being defined between the point of the main line of sight for which the optical power of the lens reaches 10% of the addition of the lens and the point of the main line of sight for which the optical power of the lens reaches 85% of the addition.

4. The progressive multifocal lens according to claim 1, wherein a gaze direction lowering angle from a fitting cross to a point of the main line of for which the optical power of the lens reaches 85% of the addition is smaller than or equal to 34°.

5. The progressive multifocal lens according to claim 1, wherein local variation of power gradients has a minimum along the main line of sight between a gaze direction of the main line of sight for which the optical power of the lens reaches 10% of the addition of the lens and a gaze direction of the main line of sight for which the optical power of the lens reaches 85% of the addition, the minimum being at least three time smaller than 0.75*Add/LP10-85, with Add being the addition of the progressive multifocal lens and LP10-85 a gaze direction lowering angle from a point of the main line of sight for which the optical power of the lens reaches 10% of the addition to a point of the main line of sight for which the optical power of the lens reaches 85% of the addition.

6. The progressive multifocal lens according to claim 1, wherein the main line of sight comprises a stabilized section along which the optical power varies less than Add/8, with Add being the addition of the progressive multifocal lens, the stabilized section having length greater than or equal to LP10-85/4, with LP 10-85 being progression length defined as a gaze direction lowering angle from a point of the main line of sight for which the optical power of the lens reaches 10% of the addition to a point of the main line of sight for which the optical power of the lens reaches 85% of the addition.

7. The progressive multifocal lens according to claim 1, wherein a width between iso-unwanted astigmatic lines representing 0.5 D has a maximum Wmax value between a point of the main line of sight for which the optical power of the lens reaches 25% of the addition to a point of the main line of sight for which the optical power of the lens reaches 85% of the addition,
Wmax being greater than or equal to LP10-85/Add, with LP10-85 being a gaze direction lowering angle from the point of the main line of sight for which the optical power of the lens reaches 10% of the addition to the point of the main line of sight for which the optical power of the lens reaches 85% of the addition and Add the addition of the progressive multifocal lens.

8. The progressive multifocal lens according to claim 1, wherein a width between iso-unwanted astigmatic lines representing 0.5 D at the fitting cross is greater than or equal to LP10-85/Add, with LP10-85 being a gaze direction lowering angle from a point of the main line of sight for which the optical power of the lens reaches 10% of the addition to a point of the main line of sight for which the optical power of the lens reaches 85% of the addition and Add the addition of the progressive multifocal lens.

9. The progressive multifocal lens according to claim 1, wherein a width between iso-unwanted astigmatic lines representing 0.5 D at a point of the main line of sight for which the optical power of the lens reaches 100% of the addition is greater than or equal to LP10-85/Add, with LP10-85 being a gaze direction lowering angle from a point of the main line of sight for which the optical power of the lens reaches 10% of the addition to a point of the main line of sight for which the optical power of the lens reaches 85% of the addition and Add the addition of the progressive multifocal lens.

10. The progressive multifocal lens according to claim 1, wherein the first major surface serves as a prescription surface, the first major surface comprising a multifocal surface without point symmetry of axial symmetry.

11. The progressive multifocal lens according to claim 1, wherein the intermediate vision region is optimized independently of at least another vision region to provide an additional optical functionality based at least on wearer parameter.

12. A method of determining a progressive multifocal lens according to claim 1, the method comprising:
a wearer data receiving, during which wearer data comprising at least the wearer's prescription is received at a lens determining side from a lens ordering side, the wearer data further comprising data relating to activity or behaviour the wearer carries out when seeking at intermediate distances,
a surface parameter determining, during which parameters defining the first and second major surfaces of the progressive multifocal lens are determined based at least on the wearer data, the parameters defining the intermediate distance vision region being determined based on the activity of the wearer when seeking at intermediate distances,
a surface parameter sending, during which parameters determined during the surface parameter determining are sent to a lens manufacturing side to have a progressive multifocal lens manufactured.

13. The method according to claim 12, wherein during the surface parameter determining, a position and/or a length and/or mean optical power of the intermediate vision region is individually optimized according to the wearer data.

14. A non-transitory computer readable program product comprising one or more stored sequences of instructions that are accessible to a processor and which, when executed by the processor, causes the processor to carry out the method of claim 12.

15. A progressive multifocal lens adapted to correct a user's vision and having a first major surface and a second major surface, where the first major surface is positioned closest to the user's eye when the progressive multifocal lens is worn by the user, the progressive multifocal lens comprising:
a far-distance vision region having a first refractive power;
a near-distance vision region having a second refractive power;
an intermediate-distance vision region having a third refractive power;
a first and a second progressive region; and
a main line of sight extending from the far-distance vision region to the near-distance vision and passing through the intermediate-distance vision region,
wherein the first progressive region joins the far-distance vision region and the intermediate-distance vision region and the second progressive region joins the intermediate-distance vision region and the near-distance vision region, and
wherein for each point of the main line of sight between a point of the main line of sight for which an optical power of the lens reaches 10% of the addition of the lens to a point of the main line of sight for which the optical power of the lens reaches 85% of the addition, a difference between the optical power of the lens and a linear optical power progression function is smaller than or equal to Add/4, with Add being an addition of the optical lens and the linear optical power progression function being defined between the point of the main line of sight for which the optical power of the lens reaches 10% of the addition of the lens and the point of the main line of sight for which the optical power of the lens reaches 85% of the addition.

* * * * *